(12) United States Patent
Schroit et al.

(10) Patent No.: US 12,105,226 B2
(45) Date of Patent: Oct. 1, 2024

(54) MODULAR DOWNHOLE TOOL RESERVOIR SYSTEM

(71) Applicant: BN TECHNOLOGY HOLDINGS INC., Houston, TX (US)

(72) Inventors: Sam Noam Schroit, Houston, TX (US); Jeffrey Bruce Wensrich, Cypress, TX (US)

(73) Assignee: BN TECHNOLOGY HOLDINGS INC., Houston, TX (US)

( * ) Notice: Subject to any disclaimer, the term of this patent is extended or adjusted under 35 U.S.C. 154(b) by 305 days.

(21) Appl. No.: 17/618,154

(22) PCT Filed: Jul. 2, 2020

(86) PCT No.: PCT/US2020/040795
§ 371 (c)(1),
(2) Date: Dec. 10, 2021

(87) PCT Pub. No.: WO2021/003457
PCT Pub. Date: Jan. 7, 2021

(65) Prior Publication Data
US 2022/0259936 A1    Aug. 18, 2022

Related U.S. Application Data

(60) Provisional application No. 62/870,655, filed on Jul. 3, 2019.

(51) Int. Cl.
*E21B 43/12* (2006.01)
*E21B 23/06* (2006.01)
*G01S 7/497* (2006.01)
*G01S 17/89* (2020.01)
*G01S 17/931* (2020.01)
*G05D 1/00* (2006.01)

(52) U.S. Cl.
CPC .............. *G01S 7/497* (2013.01); *E21B 23/06* (2013.01); *E21B 43/128* (2013.01); *G01S 17/89* (2013.01); *G01S 17/931* (2020.01); *G05D 1/0246* (2013.01)

(58) Field of Classification Search
CPC ............................ E21B 23/06; E21B 43/128
See application file for complete search history.

(56) References Cited

U.S. PATENT DOCUMENTS

| | | | | |
|---|---|---|---|---|
| 2,157,219 A | * | 5/1939 | Salentine | F04B 47/04 |
| | | | | 91/352 |
| 4,119,150 A | * | 10/1978 | Froelich | E21B 43/025 |
| | | | | 166/69 |
| 2015/0075788 A1 | * | 3/2015 | O'Brien | E21B 23/06 |
| | | | | 166/241.1 |

* cited by examiner

*Primary Examiner* — D. Andrews
*Assistant Examiner* — Ronald R Runyan

(57) ABSTRACT

A system and method are disclosed which enables the downhole provision of fluid to downhole tools that require fluid for pressurization. The system is prefilled with fluid at surface, is modular in design with a first module delivering fluid to second module and may additionally be mounted below the downhole tools requiring the fluid. Methods are disclosed which utilize the system in a bottom hole assembly during downhole operations for isolating segments of a borehole.

28 Claims, 9 Drawing Sheets

MODULAR DOWNHOLE TOOL RESERVOIR SYSTEM

CROSS-REFERENCE TO RELATED APPLICATIONS

This application claims the benefit of priority of U.S. Provisional patent Application Ser. No. 62/870,665 filed on Jul. 3, 2019 being incorporated by reference herein.

BACKGROUND

The present disclosure relates to a bottom hole assembly including a modular downhole reservoir system which facilitates isolation of a subterranean formation surrounding a downhole tubular.

BACKGROUND

A bottom hole assembly is an apparatus that is adapted for use within a borehole that extends into the earth to reach a target subterranean formation that is expected to contain valuable hydrocarbons, such as oil, gas and combinations thereof. A bottom hole assembly may be run into an existing borehole on a wireline that may provide a physical tether as well as providing connections for electrical power delivery and data communication between the bottom hole assembly and a computer system at the surface near the borehole. Furthermore, a bottom hole assembly may include one or more downhole tools, components or subsystems that perform one or more functions of the bottom hole assembly.

Certain downhole tools which may also be known as setting tools or more specifically, inflatable packer setting tools, and may include a pump for delivering pressurized fluid to an isolation tool; for example, a plug, a packer, or an inflatable packer which may also be part of a bottom hole assembly. The setting tool using the pump may be used to draw in well-fluid present within a borehole to pressurize and deliver the well-fluid to the isolation tool.

Isolation tools require a range of fluid pressures to adequately set within a borehole. During the delivery of the fluid to an isolation tool, a low pressure may be required to expand and contact the borehole; for example, less than 200 psi. Depending on the operational objective of an isolation tool installation in a borehole, the final set pressure, a high pressure, may be as much as 5,000 psi or greater. Additionally, depending on volume and inflation flowrates, the final set may require over one hour to achieve.

Certain boreholes may contain well-fluid that is incompatible with downhole pumps. For example, in some cases the well-fluid may be heavy mud, corrosive fluids or gas for which the pump is not intended or capable to operate with. Furthermore, some isolation tools may be incompatible with certain well-fluids which may otherwise be used to pressure such an isolation tool. In these cases, downhole tools known as downhole reservoir systems exist which allow an operator to carry a reservoir fluid downhole within a borehole from surface, which is compatible with the pump and/or the isolation tool. The reservoir fluid is filled in the reservoir system prior to deploying the bottom hole assembly within the borehole and may be for example, water, hydraulic oil, another fluid, or combination thereof.

Current state of the art reservoir systems are positioned within the bottom hole assembly tool string above the pump and often increase the effective outer diameter of the bottom hole assembly to facilitate routing the reservoir fluid to the pump intake. This is a disadvantage with the current state of the art reservoir systems, as it is advantageous to keep the effective outer diameter of the bottom hole assembly small. A small diameter bottom hole assembly may be conveyed through more restrictive production well tubing applications.

When the bottom hole assembly is run on electric wireline, positioning the reservoir system above the setting tool also requires the routing of the wireline or other electrical conductors through the reservoir system to the setting tool, which complicates the design and deployment of the reservoir system.

A bottom hole assembly, including a setting tool, a reservoir system and an isolation tool, may be deployed within the borehole, such that the reservoir system delivers a volume of reservoir fluid to the pump, so that the isolation tool receives pressurized reservoir fluid from the pump and may be pressurized at various locations within the borehole. In this manner, the bottom hole assembly may be used to isolate segments of the borehole for water-shut off, pressure isolation, sand isolation; or in conjunction with a formation fracturing process, formation treatment process, other processes, or other downhole operations.

BRIEF SUMMARY

One embodiment provides a modular downhole tool reservoir system comprising a first and second reservoir module. Each reservoir module comprises a reservoir fluid volume, a housing, a low pressure tube, a high pressure tube, a piston slidably sealed in the housing, the piston exposed on a first surface to well-fluid communicated through one or more ports in the housing and isolating the reservoir fluid volume exposed to a second surface of the piston. The second reservoir is disposed to deliver the second reservoir fluid volume to the low-pressure tube of the first reservoir module.

In another embodiment, a bottom hole assembly comprises the modular downhole tool reservoir system and a setting tool including a pump having in intake and an output, wherein the first reservoir module is disposed to deliver the first and second reservoir fluid volumes to the intake, and the output is disposed to deliver the first and second reservoir fluid volumes to the high-pressure tube of the first reservoir module and the high pressure tube of the second reservoir module fluidically connected thereto.

In another embodiment, the bottom hole assembly, further comprises an isolation tool disposed to receive the first and second reservoir fluid volumes from the high-pressure tubes.

In a further embodiment, there is provided a method of isolating a segment of the borehole, the method comprising the steps of: deploying the BHA on wireline; positioning the BHA near or within a tubular segment such that the isolation tool is in a position to isolate the desired segments of the borehole upon pressurization; activating the setting tool to draw in the first and second reservoir fluid volumes and deliver the volumes to the isolation tool; pressurizing the isolation tool to engage the borehole; isolating a segment of the borehole above the isolation tool from a segment of the borehole below the isolation tool.

DETAILED DESCRIPTION

Figure 1:
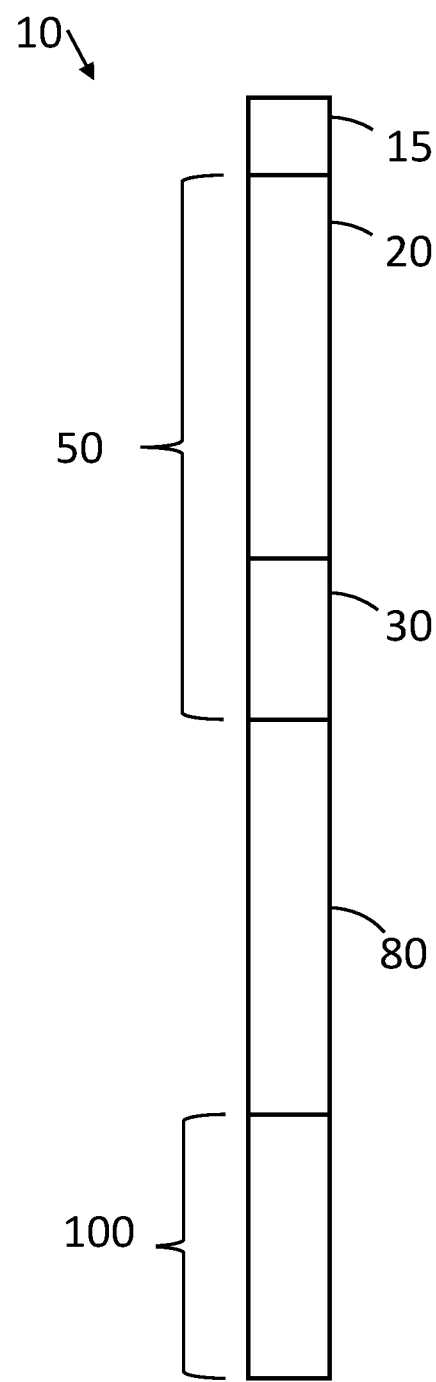
FIG. 1 is a block diagram of a bottom hole assembly including a cable head, a setting tool, a reservoir system and an isolation tool.

One embodiment provides a downhole tool for use within a borehole that extends into a subterranean formation. The downhole tool comprises a reservoir module. The reservoir module comprises a reservoir fluid volume, a housing, upper and lower endcaps, a piston, a high-pressure tube, a low-pressure tube and a coupler. The upper and lower endcaps disposed within and are secured at opposing ends of the housing; a high pressure tube including an inner and outer surface residing inside a low pressure tube including an inner and outer surface, extends from an upper region to the lower region of the housing, which is secured and fluidically connected with the upper end cap by the coupler and secured to the lower endcap; the piston is slidably sealed in the housing and on the low pressure tube. The piston is exposed on a first surface to well-fluid communicated through one or more well-fluid ports in the housing and isolates the reservoir fluid volume contained in the housing and exposed to a second surface of the piston.

The well-fluid may be a liquid, gas or a combination thereof. The well-fluid may be air, oil, water, mud, brine, corrosive fluid, a gas fluid, another fluid, any fluid present in a subterranean borehole, or a combination thereof.

The housing comprises a housing bore and may secure to a second reservoir module housing, a setting tool, an adapter to fluidically connect to an isolation tool, or to another downhole tool.

The upper and lower endcaps comprise passages which facilitate low-pressure fluid communication from a lower end of the reservoir module to the upper end of reservoir module, through a passage formed by the outer surface of the high pressure tube and the inner surface of the low-pressure tube. The upper endcap additionally comprises a high-pressure passage which facilitates high pressure communication from an upper end of the reservoir module to and through the high-pressure tube to the lower end of the reservoir module.

The piston comprises a through-hole with a rod seal to slidably seal the piston to the outer surface of the low-pressure tube and a piston seal to slidably seal on the housing bore of the housing. The piston may further comprise glide rings or bushings to ensure that it may smoothly travel the length of the housing bore and the low-pressure tube. When the pressure of the well-fluid acts on the first surface of the piston, the piston forces the reservoir fluid volume through upper endcap passages of the upper end cap.

In an embodiment, the reservoir module may further comprise a spring disposed within the housing bore, surrounding the low-pressure tube, in contact with the first surface of the piston and in contact with an upper end of the lower endcap. The spring may function to apply a force to the piston thereby pressurizing the reservoir fluid volume.

In a preferred embodiment, the downhole tool comprises a second reservoir module and is connected to the first reservoir module. The reservoir fluid volume of the second or lower reservoir module is fluidically connected to the reservoir fluid volume of the first or upper reservoir module and the high-pressure tube of the second or lower reservoir module is fluidically connected to the high-pressure tube of the first or upper reservoir module.

In an embodiment, the downhole tool includes a third or more reservoir modules, each reservoir fluid volume fluidically connected to the next and upper reservoir fluid volume and each high-pressure tube of one reservoir module fluidically connected to the high pressure tubes of the other reservoir modules.

In a further embodiment, a bottom hole assembly is provided which comprises the downhole tool and a setting tool including a pump having an intake and an output. The first reservoir module disposed to deliver reservoir fluid volume of the first and second reservoir module to the intake and the output is disposed to deliver the first and second reservoir fluid volumes to the high-pressure tube of the first reservoir module and the high pressure tube of the second reservoir module fluidically connected thereto.

In a preferred embodiment the downhole tool may be positioned downhole of the setting tool.

In an embodiment the downhole tool may be positioned uphole of the setting tool.

In a preferred embodiment, the bottom hole assembly further comprises an isolation tool disposed to receive fluid from the high-pressure tubes.

In an embodiment, the isolation tool is an inflatable packer.

In an embodiment, the isolation tool is an inflatable straddle packer.

In an embodiment, the isolation tool is a bridge plug.

In an embodiment, the isolation tool is a production packer.

In an embodiment, the isolation tool is a permanent packer.

In an embodiment, the isolation tool is a cement retainer.

In an embodiment, the isolation tool is a frac plug.

The bottom hole assembly may be connected to a wireline that extends from a wireline unit or truck located near an opening into the borehole. The wireline may be used to provide physical support of the bottom hole assembly as it is raised and lowered into and within the borehole, supply electrical power to electronic components therein, and/or provide for data communication between the bottom hole assembly and control systems outside the borehole. While the wireline may be sufficient for raising and lowering the bottom hole assembly within a substantially vertical wellbore or segment of a wellbore, the bottom hole assembly may further include a tractor that can push or pull the downhole tool along the borehole regardless of the orientation of the borehole, such as in a horizontal segment of a borehole.

Statements made herein referring to a component being "above", "below", "uphole", "downhole", "upper" or "lower" relative to another component should be interpreted as if the downhole tool or bottom hole assembly has been run into a wellbore. It should be noted that even a horizontal wellbore, or any non-vertical wellbore, still has an "uphole" direction defined by the path of the wellbore that leads to the surface and a "downhole" direction that is generally opposite to the "uphole" direction.

In an embodiment, a method is provided for the delivery of fluid out of a bottom hole assembly, the method comprising the steps of deploying the bottom hole assembly including a downhole tool, and a first and second reservoir module including a first reservoir fluid volume and a second reservoir fluid volume, respectively; activating the bottom hole assembly; a piston within the second reservoir module forcing the second reservoir fluid volume to the lower end of the first reservoir module and into a low pressure tube therethrough; the first reservoir module delivering the first reservoir fluid volume to the downhole tool and fluidically connecting the second reservoir fluid volume to the downhole tool.

In a preferred embodiment, wherein the bottom hole assembly further comprises an isolation tool, there is provided a method of isolating a segment of a borehole, the method comprising the steps of: filling a first and second reservoir module with fluid volumes prior to deployment; deploying the bottom hole assembly on wireline into the borehole; positioning the bottom hole assembly near or within a tubular segment such that the isolation tool is in a position to isolate the desired segments of the borehole upon pressurization; activating the downhole tool to draw in the first and second reservoir fluid volumes and deliver the volumes to the isolation tool; pressurizing the isolation tool to engage the borehole; isolating a segment of the borehole above the isolation tool from a segment of the borehole below the isolation tool.

In an embodiment, wherein the bottom hole assembly further comprises a locating tool, the method further includes using the locating tool to locate the desired tubular segment.

In an embodiment, the locating tool is a mechanical locating tool.

In an embodiment, the locating tool is a wireline tool.

In an embodiment, the locating tool is an electromagnetic induction tool.

In an embodiment, the locating tool is a casing collar locator.

FIG. 1 is a block diagram of a bottom hole assembly 10 including a cable head 15, a setting tool 50 including a motor module 20 and a pump module 30, a reservoir system 80 and an isolation tool 100. The reservoir system 80 may include one or more reservoir modules 60. See FIG. 4.

Figure 2A:
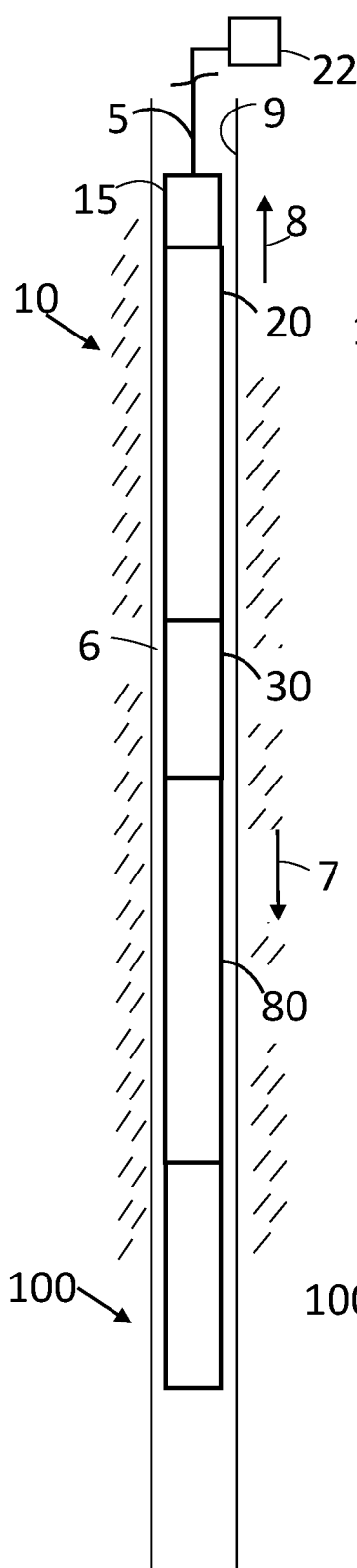
FIGS. 2A-C are diagrams of a bottom hole assembly, the bottom hole assembly including a cable head, a setting tool, a reservoir system and an isolation tool being run into a borehole on a wireline, the isolation tool in the borehole set to isolate a borehole region above the isolation tool from a segment of borehole below the isolation tool and the isolation tool left in the borehole.
Figure 2B:
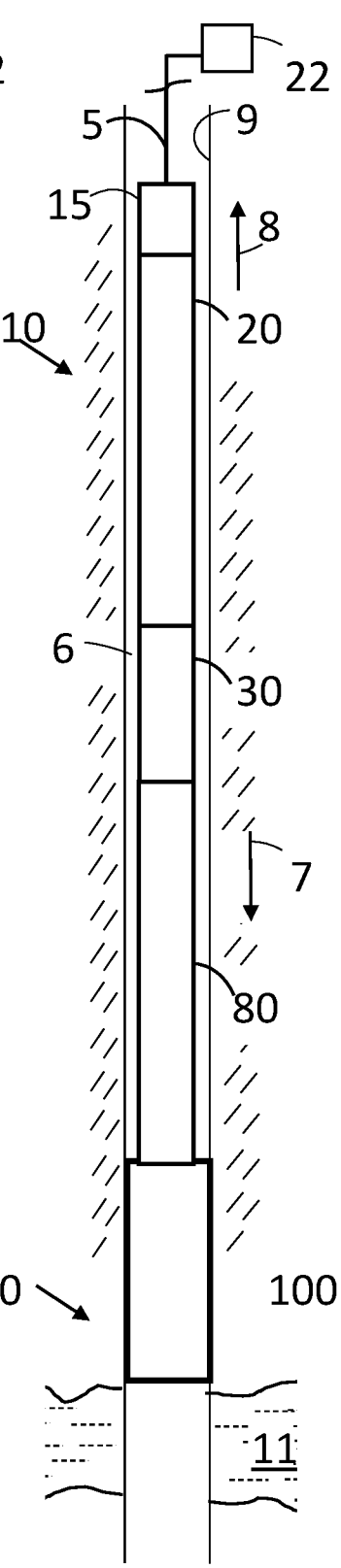
Figure 2C:
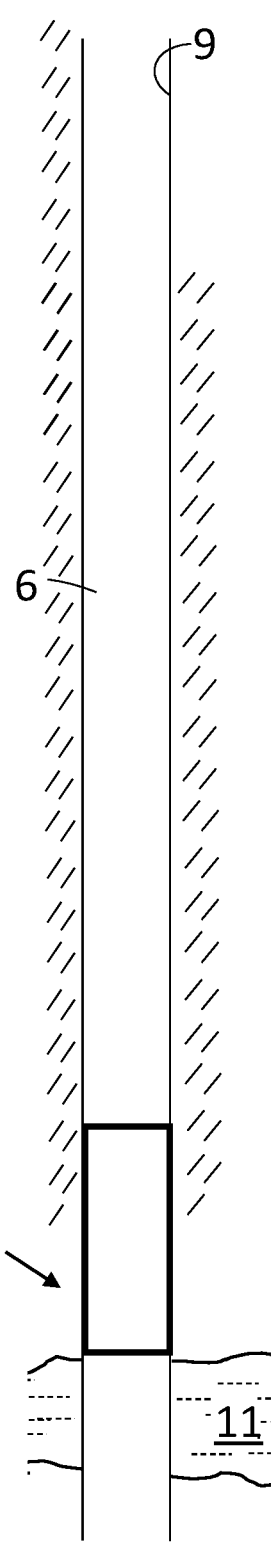

FIGS. 2A-C are schematics of an operation using the bottom hole assembly 10. In FIG. 2A the bottom hole assembly 10 is run into the borehole 6. The bottom hole assembly includes a cable head 15, a setting tool including a motor module 20 and a pump module 30, a reservoir system 80, and an isolation tool 100, being run into the borehole 6 on a wireline 5 and in communication with a surface system 22. The borehole 6 has a downhole direction 7, an uphole direction 8 and an inner wall 9. In FIG. 2B the isolation tool 100 in the borehole 6 is set near a subterranean formation 11 to isolate a borehole 6 region above the isolation tool 100 from a segment of borehole 6 below the isolation tool 100. In FIG. 2C the isolation tool 100 is left in the borehole 6 and the remainder of the bottom hole assembly 10 removed from the borehole 6.

Figure 3:
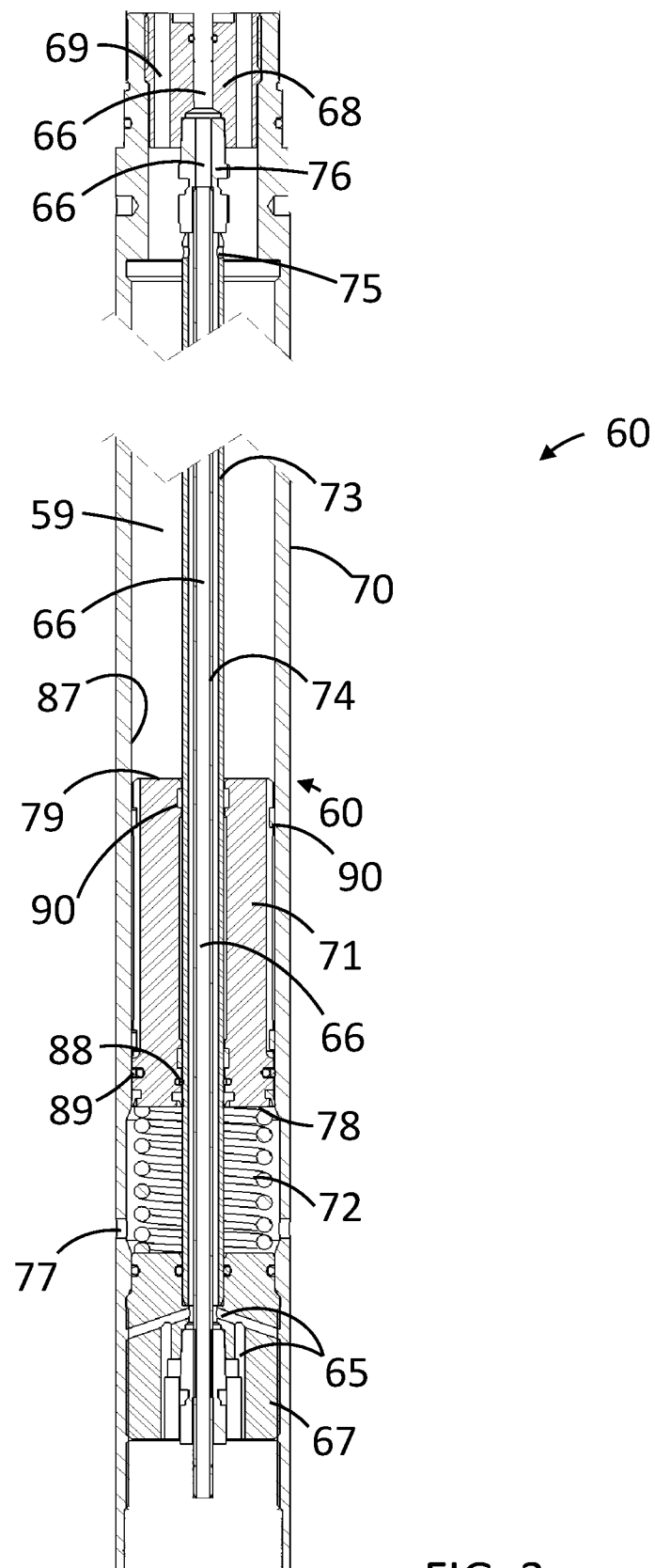
FIG. 3 is a cross-section view of a reservoir module.

FIG. 3 is cross-section views of a reservoir module 60. The reservoir module 60 includes a reservoir fluid chamber 59, a housing 70, upper end cap 68, lower endcap 67, a piston 71, a high-pressure tube 74, a low-pressure tube 73 and a coupler 76. The upper end cap 68 is secured at the upper end of the housing 70. The lower endcap is secured to the lower end of the housing 70 and sealed therein. The coupler 76 is secured and sealed to the lower end of the upper endcap 68 and secures and seals high-pressure tube 74 which is also secured at the lower endcap 67. A high-pressure passage 66 is routed through the reservoir module 60. The high pressure passage 66 is formed by a central through-hole of the upper endcap 68 which is sealed and fluidically connected to a through-hole of coupler 76, which is further sealed and fluidically connected to the interior of the high pressure tube 74. The high-pressure tube 74 is routed through the lower endcap 67 and is surrounded by the low-pressure tube 73. Near the upper end of the low-pressure tube 73, low pressure tube holes 75 fluidically connect fluid from the interior of the low-pressure tube 73 to the exterior of the low-pressure tube 73. The region exterior the low-pressure tube 73 is fluidically connected to upper endcap passage 69 of upper endcap 68. The lower end cap 67 comprises one or more lower end cap passages 65 which are fluidically connected to the region interior the low-pressure tube 73 and exterior the high-pressure tube 74. The piston 71 is slidably sealed in the housing 70 and on the low-pressure tube 73. The piston 71 is exposed on a piston first surface 78 to well-fluid communicated through one or more well-fluid ports 77 in the housing 70 and isolates the reservoir fluid chamber 59 in the housing 70 and exposed to a piston second surface 79. The piston 71 comprises a through-hole with a rod seal 88 to slidably seal the piston 71 to the outer surface of the low-pressure tube 73 and a piston seal 89 to slidably seal on the housing bore 87. The piston 71 may further comprise glide rings 90 to ensure that it may smoothly travel the length of the housing bore 87 and the low-pressure tube 73. A spring 72 is disposed within the housing 70 surrounding the low-pressure tube 73, is in contact with the piston first surface 78 and in contact with an upper end of the lower endcap 67. When the reservoir fluid chamber 59 is filled with a reservoir fluid volume; for example, prior to deployment, the spring 72 functions to apply a force to the piston 71 thereby pressurizing the reservoir fluid volume within the reservoir fluid chamber 59.

Figure 4A:
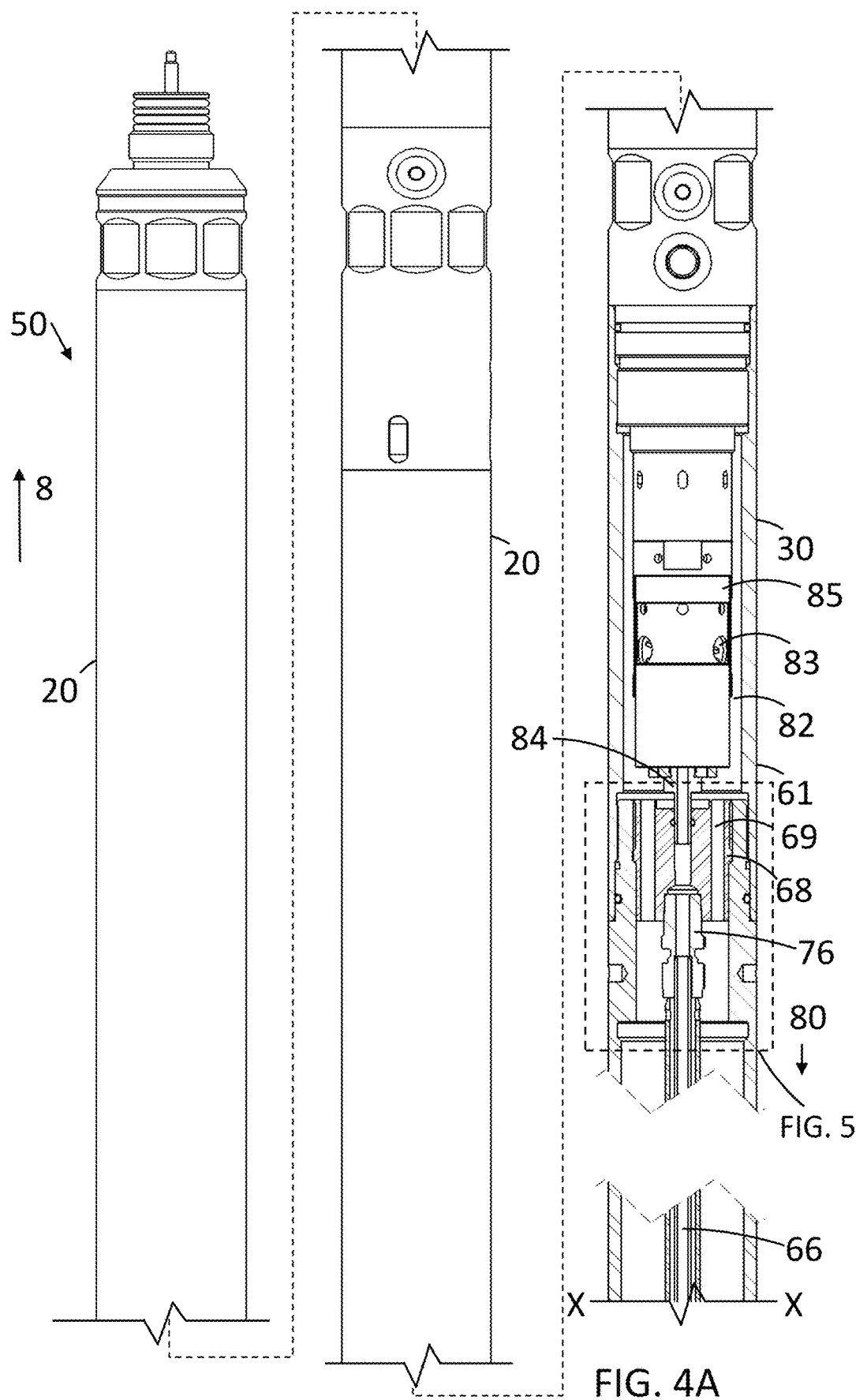
FIG. 4 on drawing page 4 and 5 is a break-out section view of bottom hole assembly including a setting tool and a reservoir system including two reservoir modules. The drawing on page 5 continues from the drawing on page 4, from and to Section X-X.
Figure 4B:
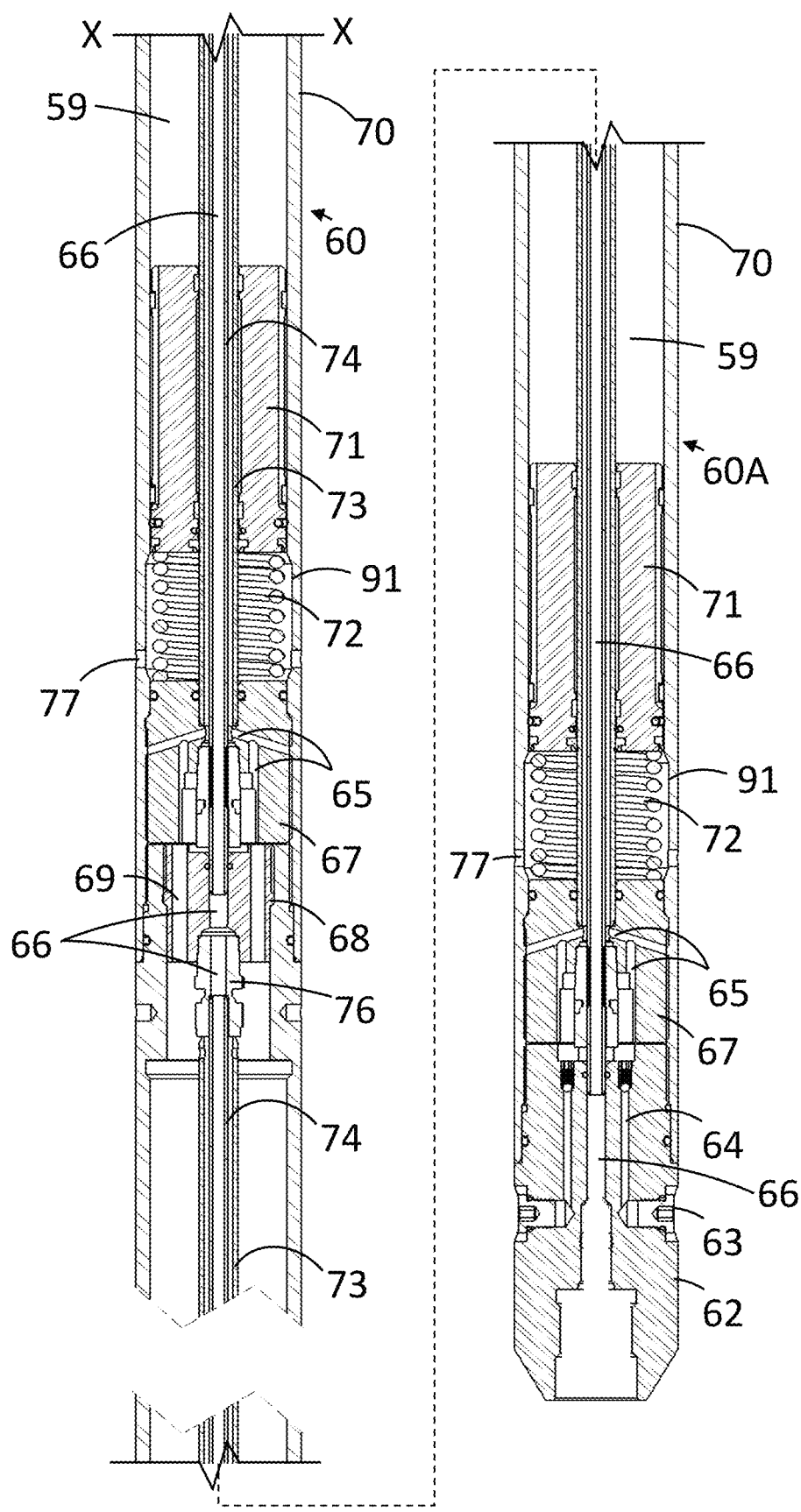
Figure 5:
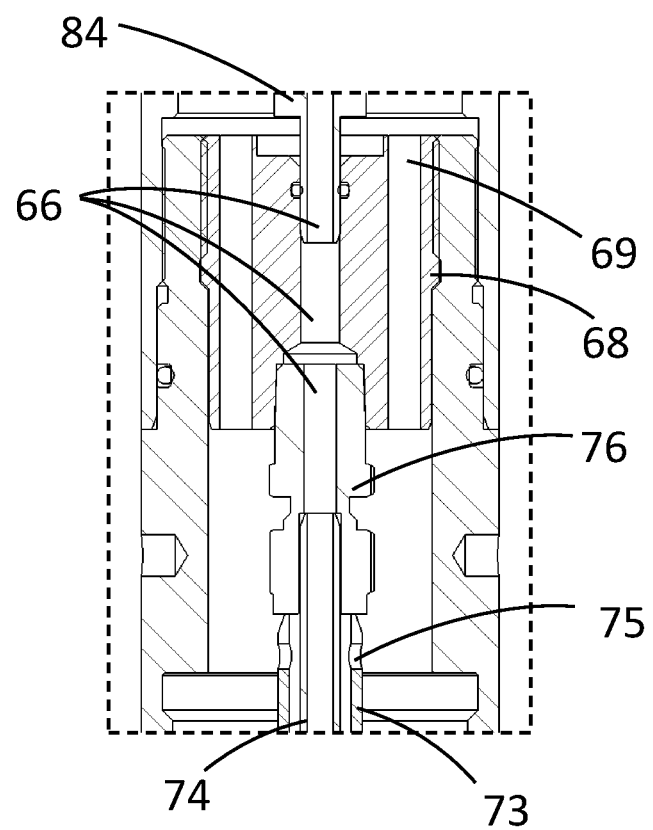
FIG. 5 is a close-up view of the dash enclosed area of FIG. 4.

FIG. 4 is a break-out section view of bottom hole assembly including a setting tool 50 and a reservoir system 80 including an upper reservoir module 60, a lower reservoir module 60A, an upper adapter 61 and a bottom adapter 62. The upper reservoir module 60 is secured and sealed to the lower end of the setting tool pump module 30 by upper adapter 61. See also FIG. 5. The high-pressure passage 66 is sealed and fluidically connected to pump output 84. The upper end cap passage 69 of the upper reservoir module 60 is fluidically connected to pump chamber 82 which resides within upper adapter 61 and is in fluid communication with pump intake ports 83. The housing 70 of upper reservoir module 60 is secured and sealed to the upper end of the housing 70 of the lower reservoir module 60A. The high-pressure tube 74 extending through the upper reservoir module 60 and the respective lower end cap 67, is sealed within the high-pressure passage 66 of the upper endcap 68 of the lower reservoir module 60A. The lower end cap passages 65 of the upper reservoir module 60 lower endcap 67, is in fluid communication with upper endcap passage 69 of upper endcap 68 of the lower reservoir module 60A. The bottom adapter 62 is secured and sealed to the lower end of the lower reservoir module 60A. The high-pressure passage 66 of the bottom adapter 62 is sealed to the high-pressure tube 74 of the lower reservoir module 60A. Fill port 63 is in fluid communication with fill passage 64, which is in fluid communication with the lower endcap passage 65 of the lower endcap 67 of the lower reservoir module 60A.

Figure 6:
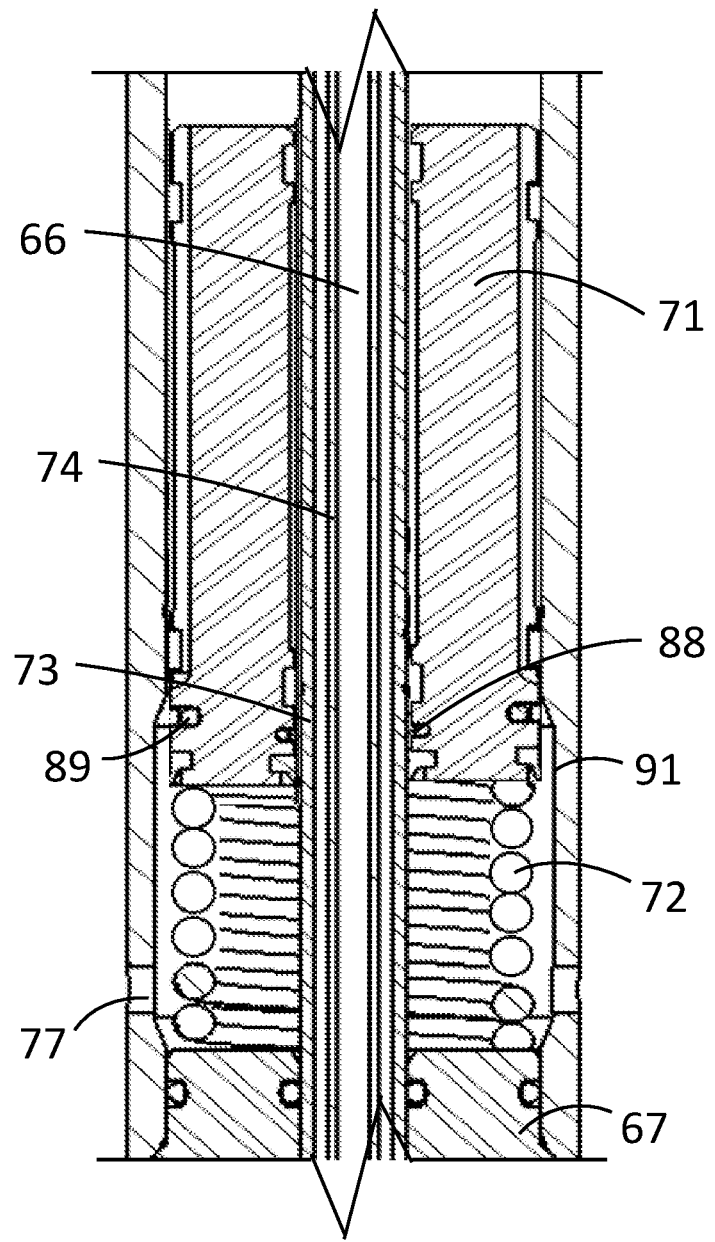
FIG. 6. is a close-up partial section view of a section of a reservoir module.

The fill port 63 may be used to fill the reservoir fluid chambers 59 with a volume of reservoir fluid; for example, prior to deployment in a borehole 6. The pressure of the reservoir fluid being filled may act on the piston second surface 79 of the upper reservoir module 60 and the lower reservoir module 60A and may compress springs 72 such that the piston seals 89 of the upper reservoir module 60 piston 71 and the lower reservoir module 60A piston 71 are temporarily unsealed from their respective housing bores 87 by entering larger bores 91 of the respective housings 70. In this manner, air or other gas within the reservoir fluid chambers 59 may be expelled from the reservoir system 80. FIG. 6 is partial section view close-up of depicting a piston in this temporarily unsealed position.

When the bottom hole assembly 10 reservoir fluid chambers 59 are filled with reservoir fluid volumes and are exposed to well-fluid pressure; for example, when deployed in a borehole 6, the pressure will act on the first piston surfaces 78 of the pistons 71 of the respective reservoir modules 60 and 60A. The piston 71 of the lower reservoir module 60A will translate in the uphole direction 8 and deliver the reservoir fluid volume in the reservoir fluid chamber 59 to upper endcap passage 69 of upper endcap 68 of the lower reservoir module 60A. The fluid volume will then flow into the lower endcap passage 65 of the lower endcap 67 of the upper reservoir module 60. The fluid will then flow into a space created by the inner surface of the low-pressure tube 73 and the outer surface of the high-pressure tube 74 of the upper reservoir module 60. The fluid will then flow out of low-pressure tube holes 75 of the low-pressure tube 73 of upper reservoir module 60 and into the upper endcap passage 69 of the upper endcap 68 of the upper reservoir module 60. From the upper endcap passage 69 of the upper endcap 68 of the upper reservoir module 60, the fluid will flow into the pump chamber 82 and into the pump intake ports 83. The piston 71 of the upper reservoir module 60 will translate in the uphole direction 8 and deliver the reservoir fluid volume in the reservoir fluid chamber 59 of the upper reservoir module 60, to upper endcap passage 69 of upper endcap 68 of the upper reservoir module 60. From the upper endcap passage 69 of the upper endcap 68 of the upper reservoir module 60, the fluid will flow into the pump chamber 82 and into the pump intake ports 83. The pump 85 will pressurize the reservoir fluid volumes and deliver it to the high-pressure passage 66 through the reservoir system 80.

Figure 7:
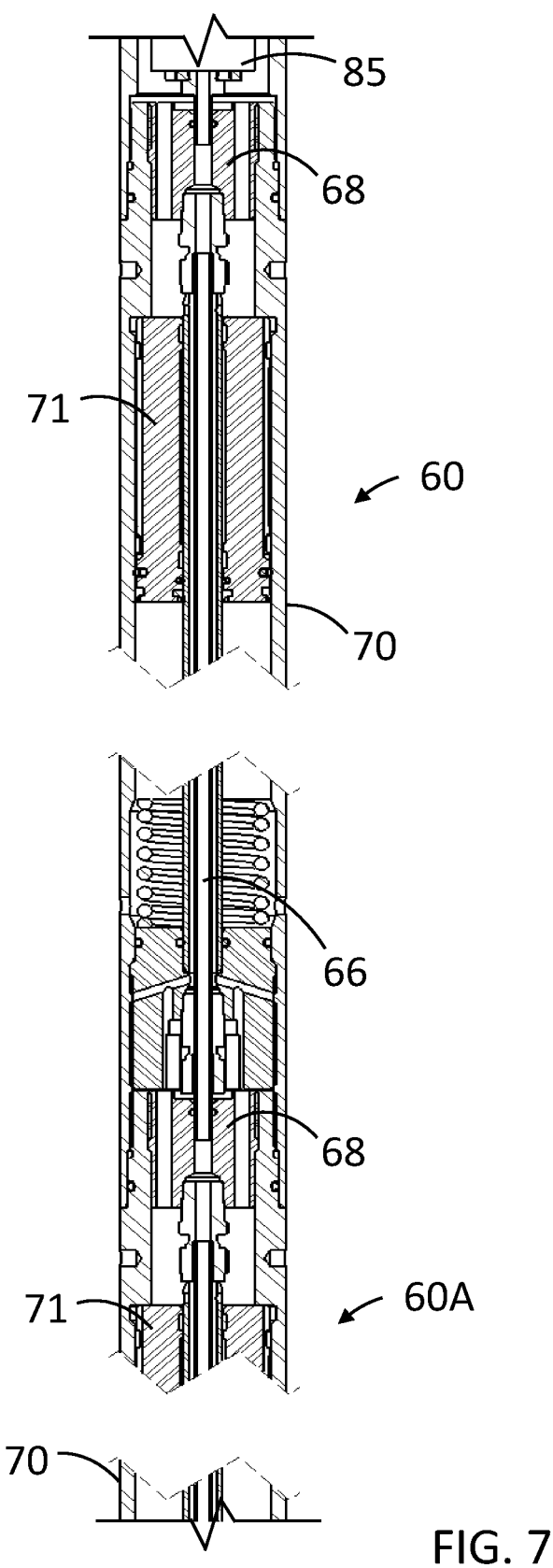
FIG. 7 is a partial section view of a section of a reservoir system.

FIG. 7 is a partial section view of the reservoir system 80 with the pistons 71 shown after they have translated in the uphole direction 8 and delivered the reservoir fluid volumes from the reservoir fluid chambers 59 to the pump 85.

In an alternative embodiment, the pistons translate in the downhole direction to deliver the reservoir fluid volumes to the pump.

Figure 8:
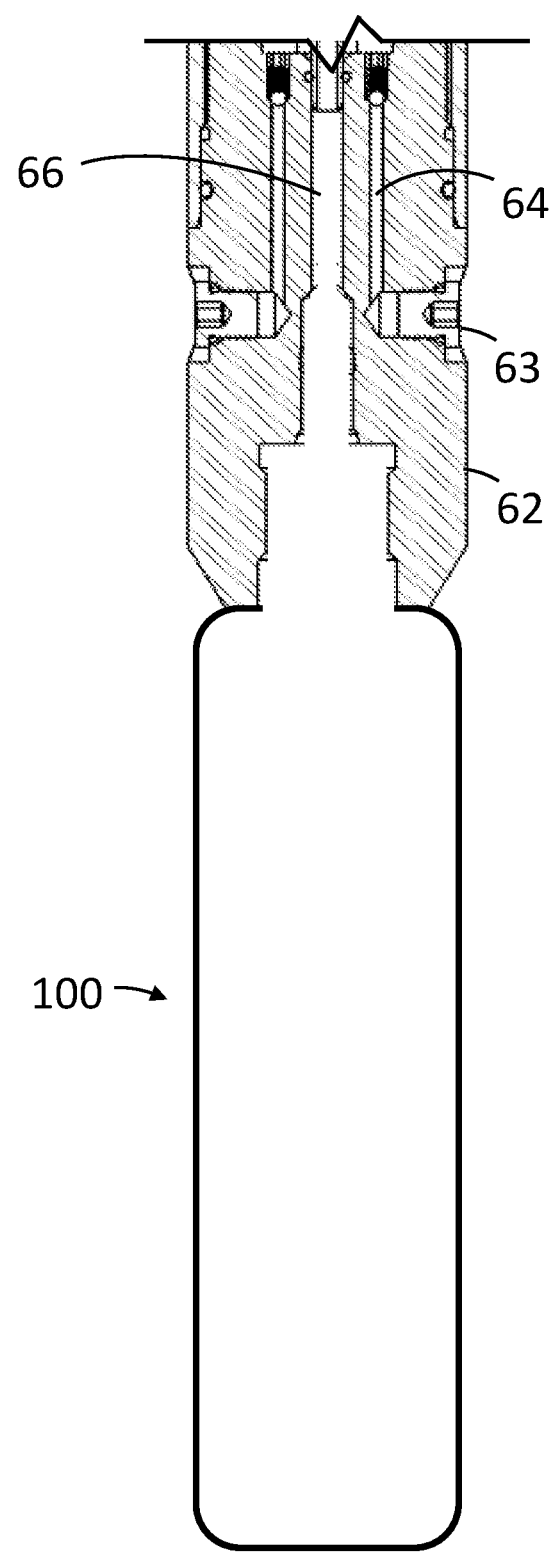
FIG. 8 is a partial section of reservoir system connected to an isolation tool.

FIG. 8 is a partial section view of how a reservoir system 80 may be connected to an isolation tool 100. The bottom adapter 62 of the reservoir system 80 is secured to the isolation tool 100 and the high-pressure passage 66 is in fluid communication with the isolation tool 100.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A bottom hole assembly for use within a borehole that extends into a subterranean formation, comprising a first reservoir module and a second reservoir module:

the first reservoir module including a first housing, a first low-pressure tube having an inner and outer surface, a first reservoir fluid volume disposed inside the first housing and outside the first low-pressure tube, a first high-pressure passage disposed through the first low-pressure tube, a first piston slidably sealed in the first housing and on the first low-pressure tube outer surface, the first piston exposed on a first surface to well-fluid communicated through one or more ports in the first housing and isolating the first reservoir fluid volume exposed to a second surface of the first piston;

the second reservoir module including a second housing, a second low-pressure tube having an inner and outer surface, a second reservoir fluid volume disposed inside the second housing and outside the second low-pressure tube, and a second high-pressure passage;

the first high-pressure passage fluidically connected to the second high-pressure passage;

the second reservoir module disposed to deliver the second reservoir fluid volume to the first low-pressure tube.

2. The bottom hole assembly of claim 1, further comprising:

a pump including an intake and an output.

3. The bottom hole assembly of claim 2, wherein the first reservoir module is disposed to deliver the first reservoir fluid volume and the second reservoir fluid volume to the intake, and the output is disposed to deliver the first reservoir fluid volume and second reservoir fluid volume to the first high-pressure passage.

4. The bottom hole assembly of claim 3, further comprising an isolation tool; wherein the isolation tool is fluidically connected to the first high-pressure passage.

5. The bottom hole assembly of claim 4, wherein the isolation tool is an inflatable packer.

6. The bottom hole assembly of claim 2, further comprising:

an isolation tool, wherein the second high-pressure passage is disposed to deliver the first reservoir fluid volume and the second reservoir fluid volume to the isolation tool.

7. The bottom hole assembly of claim 6, wherein the isolation tool is an inflatable packer.

8. The bottom hole assembly of claim 1, further comprising:
an isolation tool, wherein the first high-pressure passage and the second high-pressure passage are fluidically connected to the isolation tool.

9. The bottom hole assembly of claim 8, wherein the isolation tool is an inflatable packer.

10. The bottom hole assembly of claim 1, further comprising:
an isolation tool, wherein the second high-pressure passage is disposed to deliver the first reservoir fluid volume and the second reservoir fluid volume to the isolation tool.

11. The bottom hole assembly of claim 10, wherein the isolation tool is an inflatable packer.

12. A method of delivering fluid out of a bottom hole assembly,
the method comprising the steps of:
deploying a bottom hole assembly comprising a setting tool, and the bottom hole assembly of claim 1 wherein the second reservoir module further includes a second piston;
activating the setting tool;
the second piston forcing the second reservoir fluid volume to the lower end of the first reservoir module and into a low-pressure passage therethrough;
the first reservoir module delivering the first reservoir fluid volume to the setting tool and fluidically connecting the second reservoir fluid volume to the setting tool;
delivering the first reservoir fluid volume and the second reservoir fluid volume out of the bottom hole assembly.

13. A method of isolating a segment of a borehole, the method comprising the steps of:
deploying in the borehole a bottom hole assembly including an isolation tool, a setting tool and the bottom bole assembly of claim 1 wherein the second reservoir module further includes a second piston;
filling a first reservoir module with a first fluid volume, and filling a second reservoir module with a second reservoir fluid volume prior to deployment in the borehole;
positioning the bottom hole assembly near or within a tubular segment such that the isolation tool is in a position to isolate the desired segment of the borehole upon pressurization;
activating the setting tool to intake in the first reservoir fluid volume and the second reservoir fluid volume, and deliver the first reservoir volume and the second reservoir fluid volume to the isolation tool;
pressurizing the isolation tool to engage the borehole;
isolating a segment of the borehole above the isolation tool from a segment of the borehole below the isolation tool.

14. The method of claim 13, wherein the isolation tool is an inflatable packer.

15. The method of claim 14, wherein the bottom hole assembly further includes a locating tool.

16. The bottom hole assembly of claim 1, further comprising one or more springs disposed to pressurize the first reservoir fluid volume and the second reservoir fluid volume.

17. A bottom hole assembly including a first reservoir module for use within a borehole that extends into a subterranean formation, the first reservoir module comprising:
a first housing having an upper and lower end;
a first low-pressure tube having an inner and outer surface;
a first reservoir fluid volume disposed inside the first housing and outside the first low pressure tube;
a first high-pressure tube disposed through the first low-pressure tube;
a passage formed by an outer surface of the first high-pressure tube and an inner surface of the first low-pressure tube;
a first piston slidably sealed in the first housing and on the first low-pressure tube outer surface, the first piston exposed on a first surface to well-fluid communicated through one or more ports in the first housing and isolating the first reservoir fluid volume exposed to a second surface of the piston;
an upper endcap proximate the upper end of the first housing and above the first piston, including one or more upper endcap fluid passages fluidically connected with the passage formed by the outer surface of the first high-pressure tube and the inner surface of the first low-pressure tube;
a lower endcap proximate the lower end of the first housing and below the first piston, including one or more lower endcap fluid passages fluidically connected with the passage formed by the outer surface of the first high-pressure tube and the inner surface of the first low-pressure tube;
the passage formed by the outer surface of the first high-pressure tube and the inner surface of the first low-pressure tube, fluidically connected to the first reservoir fluid volume.

18. The bottom hole assembly of claim 17, further comprising:
a pump including an intake and an output.

19. The bottom hole assembly of claim 18, wherein the first reservoir module is disposed to deliver the first reservoir fluid volume to the intake, and the output is disposed to deliver the first reservoir fluid volume to the first high-pressure passage.

20. The bottom hole assembly of claim 17, further comprising:
a second reservoir module including a second reservoir fluid volume and a second high-pressure passage; the second reservoir module disposed to deliver the second reservoir fluid volume to the passage formed by the outer surface of the first high-pressure tube and the inner surface of the first low-pressure tube, the first high-pressure passage fluidically connected to the second high-pressure passage.

21. The bottom hole assembly of claim 20, further comprising:
a pump including an intake and an output.

22. The bottom hole assembly of claim 21, wherein the first reservoir module is disposed to deliver the first reservoir fluid volume and the second reservoir fluid volume to the intake, and the output is disposed to deliver the first reservoir fluid volume and the second reservoir fluid volume to the first high-pressure passage.

23. The bottom hole assembly of claim 22, further comprising one or more springs disposed to pressurize the first reservoir fluid volume and the second reservoir fluid volume.

24. The bottom hole assembly of claim 20, further comprising:
- an isolation tool, wherein the second high-pressure passage is disposed to deliver the first reservoir fluid volume and the second reservoir fluid volume to the isolation tool.

25. The bottom hole assembly of claim 24, wherein the isolation tool is an inflatable packer.

26. The bottom hole assembly of claim 20, further comprising:
- an isolation tool, wherein the second high-pressure passage is disposed to deliver the first reservoir fluid volume and the second reservoir fluid volume to the isolation tool.

27. The bottom hole assembly of claim 26, wherein the isolation tool is an inflatable packer.

28. The bottom hole assembly of claim 17, further comprising:
- an isolation tool, wherein the first high-pressure passage is fluidically connected to the isolation tool.

\* \* \* \* \*